(12) United States Patent
Tanaka et al.

(10) Patent No.: US 12,069,973 B2
(45) Date of Patent: Aug. 27, 2024

(54) TRACTOR

(71) Applicant: TOYOTA JIDOSHA KABUSHIKI KAISHA, Aichi-ken (JP)

(72) Inventors: Nobuyuki Tanaka, Toyota (JP); Yuki Sugo, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 281 days.

(21) Appl. No.: 17/717,130

(22) Filed: Apr. 11, 2022

(65) Prior Publication Data

US 2022/0338404 A1    Oct. 27, 2022

(30) Foreign Application Priority Data

Apr. 23, 2021 (JP) ................................. 2021-073575

(51) Int. Cl.
*A01B 63/12* (2006.01)
(52) U.S. Cl.
CPC .................................... *A01B 63/12* (2013.01)
(58) Field of Classification Search
CPC ......... A01B 63/12; A01B 76/00; B60L 50/60; B60L 3/0046–0061; B60L 58/10
See application file for complete search history.

(56) References Cited

FOREIGN PATENT DOCUMENTS

JP       2014-143965 A     8/2014
WO   WO-2017190696 A1 *  11/2017 ........... A01B 51/026

* cited by examiner

*Primary Examiner* — Tara Mayo
(74) *Attorney, Agent, or Firm* — HAUPTMAN HAM, LLP

(57) ABSTRACT

A tractor includes: a work machine connected to a vehicle body; an elevator mechanism configured to move the work machine up and down; an electric motor; a battery; an electric leakage detection circuit configured to detect electric leakage in the battery; and a control device. The control device controls the elevator mechanism either in a lowered state or a raised state, the lowered state being a state where the work machine is placed at a position making contact with a ground, the raised state being a state where the work machine is placed at a position distanced from the ground. In a case where the electric leakage detection circuit detects electric leakage in the battery at the time when the elevator mechanism is in the lowered state, the control device performs a state change process of bringing the elevator mechanism into the raised state.

4 Claims, 3 Drawing Sheets

TRACTOR

CROSS-REFERENCE TO RELATED APPLICATION

This application claims priority to Japanese Patent Application No. 2021-073575 filed on Apr. 23, 2021, incorporated herein by reference in its entirety.

BACKGROUND

1. Technical Field

This disclosure relates to a tractor.

2. Description of Related Art

A tractor described in Japanese Unexamined Patent Application Publication No. 2014-143965 (JP 2014-143965 A) includes a battery, an electric motor, a lift arm, and a rotary tiller. The battery supplies electric power to the electric motor. The electric motor is driven upon receipt of electric power from the battery. A driving force from the electric motor is input into the rotary tiller via a PTO shaft. The lift arm operates by hydraulic pressure. The lift arm moves the rotary tiller up and down. The rotary tiller is drivable in a state where the rotary tiller makes contact with the ground of a farm field such as farm, for example. By driving the rotary tiller in a state where the rotary tiller makes contact with the ground of the farm field, the farm field can be cultivated.

SUMMARY

In the tractor described in JP 2014-143965 A, a drive source for the rotary tiller is the electric motor. Accordingly, a battery with a relatively high capacity and a relatively high voltage is employed as the battery configured to supply electric power to the electric motor. On this account, when some sort of abnormality occurs in the battery and its peripheral circuit, it is necessary to take measures to prevent a current from flowing into other components. However, the tractor described in JP 2014-143965 A includes a device such as the rotary tiller that is not provided in normal automobiles. Further, the tractor described in JP 2014-143965 A does not necessarily travel on a paved road surface for traveling, and the tractor may travel in a muddy farm field. As such, the tractor described in JP 2014-143965 A is different from normal automobiles in terms of a device configuration and is also different from normal automobiles in terms of an expected traveling environment. Accordingly, to take measures similar to those taken in normal automobiles as measures for some sort of abnormality occurring in the battery or the like may not be necessarily appropriate.

A tractor accomplished to solve the above problem includes a vehicle body, a work machine, an elevator mechanism, an electric motor, a battery, an electric leakage detection circuit, and a control device. The work machine is connected to the vehicle body. The elevator mechanism is configured to move the work machine up and down. The electric motor serves as a drive source for the work machine. The battery is configured to supply electric power to the electric motor. The electric leakage detection circuit is configured to detect electric leakage in the battery. The control device is configured to control the elevator mechanism as a target to be controlled. The control device controls the elevator mechanism either in a lowered state or in a raised state, the lowered state being a state where the work machine is placed at a position making contact with a ground, the raised state being a state where the work machine is placed at a position distanced from the ground. In a case where the electric leakage detection circuit detects electric leakage in the battery when the elevator mechanism is in the lowered state, the control device performs a state change process of bringing the elevator mechanism into the raised state.

In the above configuration, by performing the state change process, the work machine is distanced from a ground. Hereby, even in a case where a farm field is wet and electricity easily flows therethrough, it is possible to prevent leaked electricity from flowing into the farm field via the work machine. Accordingly, even when electric leakage occurs in the battery and its peripheral circuit, it is possible to prevent electricity from flowing through the work machine or the like.

A tractor accomplished to solve the above problem includes a vehicle body, a work machine, an elevator mechanism, an electric motor, a battery, an electric leakage detection circuit, a notification device, and a control device. The work machine is connected to the vehicle body. The elevator mechanism is configured to move the work machine up and down. The electric motor serves as a drive source for the work machine. The battery is configured to supply electric power to the electric motor. The electric leakage detection circuit is configured to detect electric leakage in the battery. The notification device is configured to perform notification by at least either one of light and sound. The control device is configured to control the notification device as a target to be controlled. The control device controls the elevator mechanism either in a lowered state or in a raised state, the lowered state being a state where the work machine is placed at a position making contact with a ground, the raised state being a state where the work machine is placed at a position distanced from the ground. In a case where the electric leakage detection circuit detects electric leakage in the battery when the elevator mechanism is in the lowered state, the control device performs a change notification process of causing the notification device to notify that it is necessary to change the elevator mechanism to the raised state.

In the above configuration, when an occupant brings the elevator mechanism into the raised state in response to the change notification process, the work machine is distanced from the ground. Hereby, even in a case where the farm field is wet and electricity easily flows therethrough, it is possible to prevent leaked electricity from flowing into the farm field via the work machine. Accordingly, even when electric leakage occurs in the battery and its peripheral circuit, it is possible to prevent electricity from flowing through the work machine or the like.

The tractor may further include a notification device configured to perform notification by at least either one of light and sound. In a case where the electric leakage detection circuit detects electric leakage in the battery when the elevator mechanism is in the lowered state, the control device may perform the following processes: an estimation process of estimating a water content in the ground at a time when the electric leakage detection circuit detects the electric leakage; a determination process of determining whether or not the water content is less than a specified water content determined in advance; and an evacuation notification process of, in a case where the control device determines that the water content is less than the specified water content in the determination process, causing the notification device to notify that an occupant is allowed to get off the tractor, and in a case where the control device determines that the water content is equal to or more than the specified water content in the determination process, causing the notification device to notify that the occupant is not allowed to get off the tractor.

In a case where the water content in the ground is small, it is difficult for electricity to flow through the ground in balance with electric resistance of the ground. Under such a situation, the occupant can get off the tractor. When the occupant gets off the tractor, the occupant can be distanced from the vehicle body. Accordingly, the safety for the occupant can be secured more surely. In the meantime, in a case where the water content in the ground is large, electricity easily flows through the ground. In the above configuration, it is possible to present a safer evacuation way to the occupant.

The tractor may further include a relay configured to turn on and off electrical connection between the battery and the electric motor. In a case where the control device determines that the water content is less than the specified water content in the determination process, the control device may perform a shutdown process of turning off the electrical connection achieved by the relay, on condition that the elevator mechanism is in the raised state.

In the above configuration, after the electrical connection achieved by the relay is turned off, the battery is brought into a non-energized state. Accordingly, after that, no electric leakage occurs in the battery and its peripheral circuit. This accordingly makes it possible to restrain electric leakage in the battery and its peripheral circuit to a minimum.

In the tractor, in a case where the electric leakage detection circuit detects electric leakage in the battery when the elevator mechanism is in the lowered state, the control device may perform a restriction process of restricting output from the battery, on condition that the elevator mechanism is in the raised state.

In the above configuration, along with the restraint of the output from the battery, it is possible to restrain an electric leakage amount from the battery and its peripheral circuit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
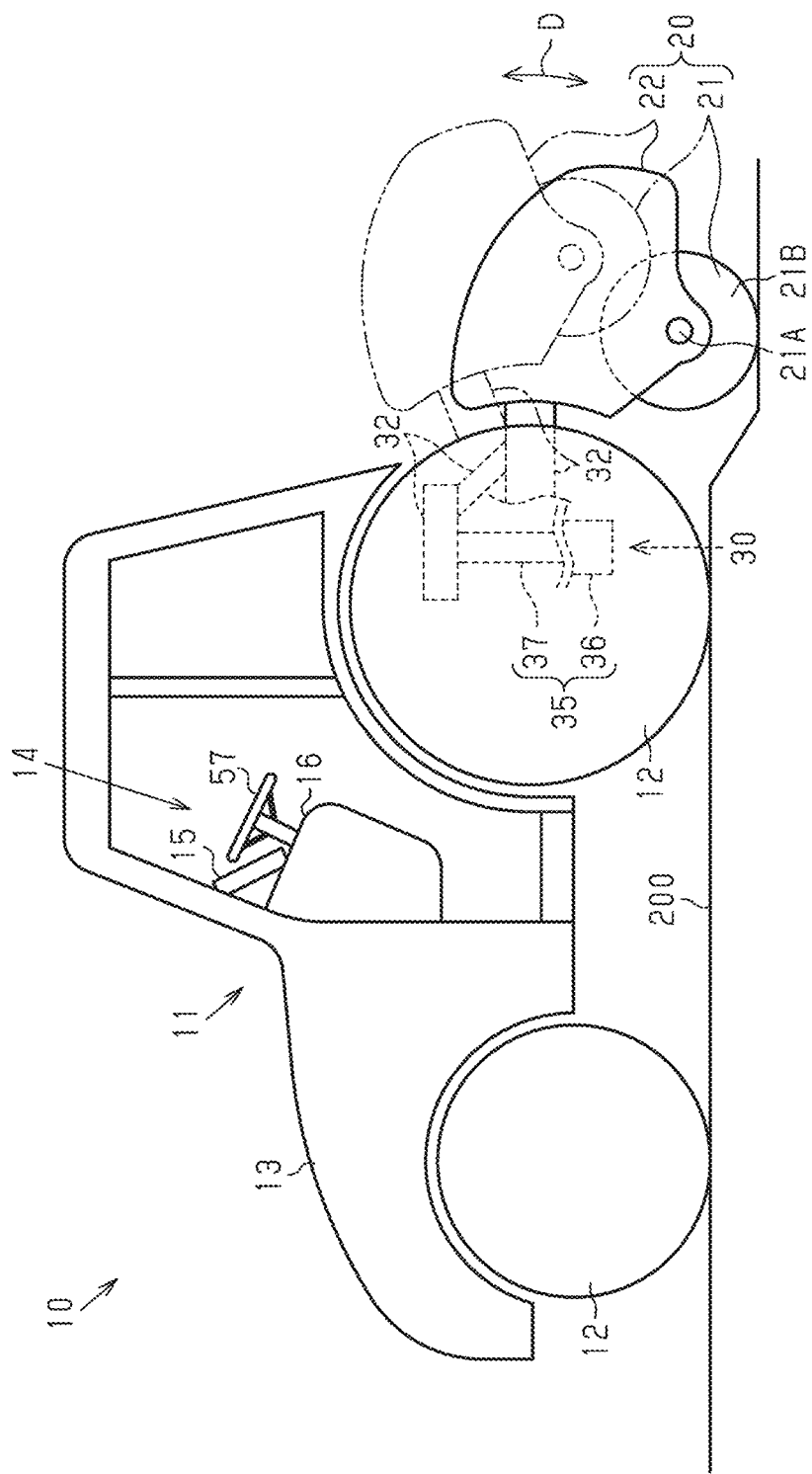
FIG. 1 is a schematic view of a tractor.

Referring to the drawings, the following describes one embodiment of a tractor.

Overall Configuration of Tractor

As illustrated in FIG. 1, a tractor 10 includes a vehicle 11, a work machine 20, and an elevator mechanism 30. The vehicle 11 includes a plurality of wheels 12 and a vehicle body 13. The wheels 12 are connected to the vehicle body 13. The vehicle body 13 includes a cabin 14. The cabin 14 is a space defined by the vehicle body 13. The cabin 14 is a control room that an occupant gets in.

The work machine 20 is placed behind the vehicle 11. The work machine 20 includes a support member 22 and a rotating body 21. The support member 22 is connected to the vehicle body 13 via the elevator mechanism 30. Details of this connection form will be described later. The rotating body 21 includes a rotating shaft 21A supported by the support member 22 and a plurality of blades 21B. The rotating shaft 21A is perpendicular to both an advancing direction and a gravitational direction when the vehicle 11 travels. That is, the rotating shaft 21A faces sideways. The blades 21B are connected to the rotating shaft 21A. The blades 21B rotate integrally with the rotating shaft 21A. Note that, in FIG. 1, the blades 21B are simplified and illustrated in a cylindrical shape. Part of the lower side of a rotational locus of the blades 21B is placed downward from a lowermost end of the support member 22. When the rotating shaft 21A rotates in a state where the blades 21B make contact with a ground 200 of a farm field, the farm field can be cultivated. Note that the support member 22 and the rotating body 21 are made of metal.

The elevator mechanism 30 includes a plurality of arms 32 and a hydraulic fixture 35. The arms 32 are connected to each other. Further, the arms 32 connect the vehicle body 13 to the support member 22 of the work machine 20.

The hydraulic fixture 35 includes a hydraulic circuit 36 and an elevator cylinder 37. The hydraulic circuit 36 supplies hydraulic pressure to the elevator cylinder 37. The elevator cylinder 37 extends and contracts in response to the hydraulic pressure from the hydraulic circuit 36. The elevator cylinder 37 is connected to the arms 32. The arms 32 move in response to the extension and contraction of the elevator cylinder 37. Along with that, the work machine 20 moves up and down as indicated by an arrow D in FIG. 1. In the following description, a state of the elevator mechanism 30 in which the rotating body 21 of the work machine 20 is placed at a position making contact with the ground 200 is referred to as a lowered state. Further, a state of the elevator mechanism 30 in which the rotating body 21 is placed at a position distanced from the ground 200 is referred to as a raised state. Note that, in FIG. 1, the position of the work machine 20 at the time when the elevator mechanism 30 is in the lowered state is illustrated by a continuous line. Further, in FIG. 1, the position of the work machine 20 at the time when the elevator mechanism 30 is in the raised state is illustrated by an alternate long and two short dashes line.

The tractor 10 includes an operation table 16 and a display 15. The operation table 16 is placed inside the cabin 14. The display 15 is placed on the operation table 16. Various pieces of information can be displayed on the display 15. That is, the display 15 is a notification device configured to notify various pieces of information by light.

Figure 2:
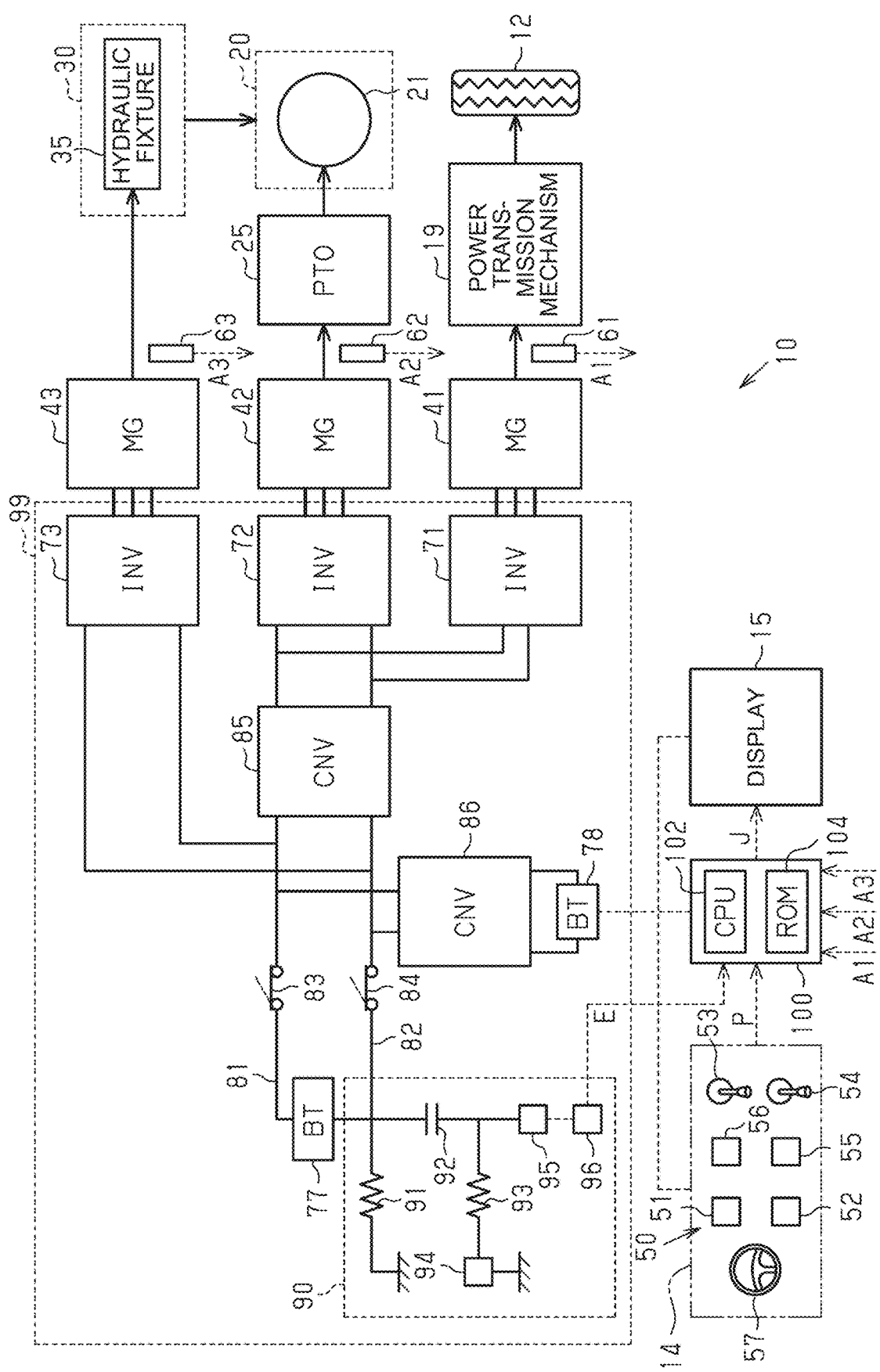
FIG. 2 is a view illustrating an electrical configuration of the tractor and a power transmission path in the tractor.

As illustrated in FIG. 2, as an operating portion 50, the tractor 10 includes a first switch 51, a second switch 52, and a third switch 56. The first switch 51 is a switch to be turned on or off by an occupant based on whether the tractor 10 is placed in a farm field or not. That is, the first switch 51 is a switch via which position information on the tractor 10 is input. The second switch 52 is a switch configured to change the elevator mechanism 30 between the lowered state and the raised state. The third switch 56 is a reset switch to clear display on the display 15 along with a measures process (described later). The first switch 51, the second switch 52, and the third switch 56 are placed on the operation table 16, for example.

Further, as the operating portion 50, the tractor 10 includes a first lever 53, a second lever 54, an ignition switch 55, and a steering wheel 57. The first lever 53 is configured to change the rotation of the rotating body 21 between ON and OFF and also to change the rotation speed of the rotating body 21. The second lever 54 is configured to change the traveling speed of the tractor 10. The ignition switch 55 is configured to activate the tractor 10. The ignition switch 55 is also referred to as a start switch. The steering wheel 57 is provided for steerage and is configured to control the traveling direction of the tractor 10. The first lever 53, the second lever 54, the ignition switch 55, and the steering wheel 57 are placed inside the cabin 14, for example. Note that, in FIG. 2, those members provided as the operating portion 50 are simplified and illustrated schematically.

Power Transmission Path in Tractor

As illustrated in FIG. 2, the tractor 10 includes a first electric motor 41, a second electric motor 42, a third electric motor 43, a power transmission mechanism 19, and a PTO 25. The first electric motor 41, the second electric motor 42, and the third electric motor 43 are generator motors.

The first electric motor 41 is a drive source configured to move the tractor 10. The first electric motor 41 is connected to the wheels 12 via the power transmission mechanism 19. The power transmission mechanism 19 includes a deceleration mechanism configured to amplify and output a torque, for example.

The second electric motor 42 is a drive source for the work machine 20. The second electric motor 42 is connected to the rotating body 21 of the work machine 20 via the PTO 25. The PTO 25 is a device configured to transmit a torque of the second electric motor 42 to the rotating body 21. The PTO 25 includes a deceleration mechanism, for example.

The third electric motor 43 is a drive source for the hydraulic fixture 35. The third electric motor 43 is connected to a hydraulic pump of the hydraulic circuit 36. The third electric motor 43 drives the hydraulic pump. Note that, as described above, the first electric motor 41, the second electric motor 42, and the third electric motor 43 are generator motors. Accordingly, these electric motors can be functionalized as generators. For example, in a case of the first electric motor 41, at the time when the tractor 10 decelerates, the first electric motor 41 can be functionalized as a generator. On this occasion, a regenerative braking force corresponding to the power generation amount of the first electric motor 41 is generated in the tractor 10.

The tractor 10 includes a first rotation sensor 61, a second rotation sensor 62, and a third rotation sensor 63. The first rotation sensor 61 detects the rotation position of a rotor of the first electric motor 41. The second rotation sensor 62 detects the rotation position of a rotor of the second electric motor 42. The third rotation sensor 63 detects the rotation position of a rotor of the third electric motor 43.

Electrical Configuration of Tractor

As illustrated in FIG. 2, the tractor 10 includes a power supply circuit 99. The power supply circuit 99 includes a first battery 77, a second battery 78, a positive electrode line 81, a negative electrode line 82, a positive electrode relay 83, and a negative electrode relay 84. Further, the power supply circuit 99 includes a first converter 85, a second converter 86, a first inverter 71, a second inverter 72, and a third inverter 73.

The first battery 77 is a secondary battery. The first battery 77 is a high-voltage main battery configured to move the tractor 10, drive the work machine 20, and drive the elevator mechanism 30. The first battery 77 is configured to transmit and receive electric power to and from the first electric motor 41, the second electric motor 42, and the third electric motor 43.

A high-potential-side terminal of the first battery 77 is connected to the first converter 85 via the positive electrode line 81. Further, a low-potential-side terminal of the first battery 77 is connected to the first converter 85 via the negative electrode line 82. The first converter 85 converts the magnitude of a voltage and outputs the voltage.

The positive electrode relay 83 is placed in the middle of the positive electrode line 81. The negative electrode relay 84 is placed in the middle of the negative electrode line 82. The positive electrode relay 83 and the negative electrode relay 84 turn on and off electrical connection between the first battery 77 and the first converter 85.

The first inverter 71 and the second inverter 72 are connected to the first converter 85. The first inverter 71 and the second inverter 72 are parallel to each other. The first inverter 71 is connected to the first electric motor 41. The first inverter 71 performs power conversion from direct current to alternating current and vice versa between the first converter 85 and the first electric motor 41. The second inverter 72 is connected to the second electric motor 42. The second inverter 72 performs power conversion from direct current to alternating current and vice versa between the first converter 85 and the second electric motor 42.

The third inverter 73 is connected to the first battery 77. The third inverter 73 is parallel to the first converter 85. The third inverter 73 is connected to the third electric motor 43. The third inverter 73 performs power conversion from direct current to alternating current and vice versa between the first battery 77 and the third electric motor 43.

The second converter 86 is connected to the first battery 77. The second converter 86 is parallel to the first converter 85. The second converter 86 converts the magnitude of a voltage and outputs the voltage. The second converter 86 is connected to the second battery 78. The second battery 78 is a secondary battery. The second battery 78 is an auxiliary battery with a voltage lower than that of the first battery 77. The second battery 78 is connected to low-voltage devices such as the display 15, the operating portion 50, and a control device 100 (described later), for example.

Electric Leakage Detection Circuit

The power supply circuit 99 includes an electric leakage detection circuit 90. The electric leakage detection circuit 90 is a circuit configured to detect electric leakage in the first battery 77. The electric leakage detection circuit 90 includes a first resistor 91, a capacitor 92, a second resistor 93, a transmitter 94, a voltmeter 95, and a monitoring circuit 96. The first resistor 91 is connected to a part between the low-potential-side terminal of the first battery 77 and the vehicle body 13 serving as earth. The first resistor 91 has a resistance value of several megaohms. A first end of the capacitor 92 is connected to the low-potential-side terminal of the first battery 77. A second end of the capacitor 92 is connected to the transmitter 94 via the second resistor 93. The transmitter 94 is connected to the vehicle body 13 serving as earth. The transmitter 94 outputs a pulse signal with a specific frequency. The voltmeter 95 detects a voltage of a connecting point between the capacitor 92 and the second resistor 93.

The monitoring circuit 96 monitors the voltage detected by the voltmeter 95. In a case where the voltage detected by the voltmeter 95 is equal to or less than a specified voltage, the monitoring circuit 96 detects electric leakage in the first battery 77. In this case, the monitoring circuit 96 outputs an electric-leakage detection signal E. Here, in a case where electric leakage occurs in the first battery 77, the resistance value of the first resistor 91, namely, an insulation resistance value decreases. Then, the voltage of the connecting point between the capacitor 92 and the second resistor 93 decreases. A maximum value of the resistance value that the first resistor 91 can take in a case where electric leakage occurs in the first battery 77 is referred to an electric-leakage resistance value. The specified voltage is a voltage of the connecting point between the capacitor 92 and the second resistor 93 at the time when the resistance value of the first resistor 91 is the electric-leakage resistance value. The specified voltage and the electric-leakage resistance value are determined in advance by experiment, for example. Note that, even in a case where electric leakage occurs in an electric system of a peripheral circuit of the first battery 77, e.g., the negative electrode line 82, instead of the electric leakage in the first battery 77 itself, the voltage of the connecting point between the capacitor 92 and the second resistor 93 also decreases. Even in such a case, when the voltage is equal to or less than the specified voltage, the monitoring circuit 96 considers that electric leakage occurs in the first battery 77, and the monitoring circuit 96 outputs the electric-leakage detection signal E.

Schematic Configuration of Control Device

The tractor 10 includes the control device 100. The control device 100 can be configured as one or more processors configured to execute various processes in accordance with a computer program (software). Note that the control device 100 may be configured as one or more exclusive hardware circuits such as an application specific integrated circuit (ASIC) configured to execute at least one of various processes or a circuitry including a combination of the exclusive hardware circuits. The processor includes a CPU 102 and a memory such as a RAM or a ROM 104. A program code or a command configured to cause the CPU 102 to execute a process is stored in the memory. The memory, that is, a computer-readable medium includes all available media accessible by a general-purpose or exclusive computer. The control device 100 includes a storage device as an electrically rewritable nonvolatile memory.

The control device 100 receives the electric-leakage detection signal E from the electric leakage detection circuit 90. Further, the control device 100 receives a signal P from the operating portion 50. Note that the control device 100 separately receives respective signals from the switches and the levers, but in the specification and the drawings, a common reference sign P is assigned to signals from respective members provided as the operating portion 50.

The control device 100 receives a detection signal A1 from the first rotation sensor 61, a detection signal A2 from the second rotation sensor 62, and a detection signal A3 from the third rotation sensor 63. The control device 100 calculates a first rotation speed Smg1 representing the rotation speed of the rotor of the first electric motor 41 based on the detection signal A1 from the first rotation sensor 61. Similarly, the control device 100 calculates a second rotation speed Smg2 representing the rotation speed of the rotor of the second electric motor 42 based on the detection signal A2 from the second rotation sensor 62. Similarly, the control device 100 calculates a third rotation speed Smg3 representing the rotation speed of the rotor of the third electric motor 43 based on the detection signal A3 from the third rotation sensor 63.

The first electric motor 41 is a target to be controlled by the control device 100. The control device 100 controls the first electric motor 41 such that the tractor 10 travels or the tractor 10 stops traveling. Note that the control device 100 substantially controls the first electric motor 41 by controlling the first inverter 71. The control device 100 refers to the first rotation speed Smg1 and controls the first electric motor 41 such that a traveling speed for the tractor 10 to be instructed by the occupant through the second lever 54 is achieved.

The work machine 20 is a target to be controlled by the control device 100. More specifically, the control device 100 controls the work machine 20 through a control on the second electric motor 42. That is, the control device 100 controls the second electric motor 42 such that the rotating body 21 rotates or the rotating body 21 stops rotating. Note that the control device 100 substantially controls the second electric motor 42 by controlling the second inverter 72. The control device 100 refers to the second rotation speed Smg2 and controls the second electric motor 42 such that a rotation speed for the rotating body 21 to be instructed by the occupant through the first lever 53 is achieved. In the control device 100, a plurality of target rotation speeds is stored in advance as information to achieve the rotation speed for the rotating body 21 to be instructed by the occupant. The target rotation speed is a target value for the rotation speed of the second electric motor 42. More specifically, in the control device 100, the target rotation speeds are stored in association with respective change positions of the first lever 53. The control device 100 controls the second electric motor 42 based on these target rotation speeds.

The elevator mechanism 30 is a target to be controlled by the control device 100. More specifically, the control device 100 controls hydraulic pressure to be supplied to the elevator cylinder 37 through controls on the third electric motor 43, a control valve inside the hydraulic circuit 36, and so on. Hereby, the elevator mechanism 30 is brought into the raised state or the lowered state. Note that the control device 100 substantially controls the third electric motor 43 by controlling the third inverter 73. The control device 100 refers to the third rotation speed Smg3 and controls the third electric motor 43 such that a state for the elevator mechanism 30 to be instructed by the occupant through the second switch 52 is achieved. Further, the control device 100 opens and closes the control valve inside the hydraulic circuit 36 in response to the control on the third electric motor 43.

The display 15 is a target to be controlled by the control device 100. The control device 100 outputs, to the display 15, a display signal J to display various pieces of information on the display 15. When the display 15 receives the display signal J, the display 15 displays a content corresponding to the display signal J.

The positive electrode relay 83 and the negative electrode relay 84 are targets to be controlled by the control device 100. That is, the control device 100 turns on or off electrical connection achieved by the positive electrode relay 83 and the negative electrode relay 84 in response to ON or OFF of the ignition switch 55. Note that, when the electrical connection achieved by the positive electrode relay 83 and the negative electrode relay 84 is turned on, the first battery 77 is brought into an energized state. That is, the first battery 77 supplies electric power to devices connected to the first battery 77. In the meantime, when the electrical connection achieved by the positive electrode relay 83 and the negative electrode relay 84 is turned off, the first battery 77 is brought into a non-energized state. Even in this case, the control device 100 maintains an activated state by receiving electric power from the second battery 78. This also applies to the display 15.

Outline of Measures Process

Even in a case where the control device 100 does not receive any instruction from the occupant through the operating portion 50, the control device 100 can control various portions as the targets to be controlled. As one of the processes on the various portions, the control device 100 can execute a measures process. The measures process is a process of taking measures for occurrence of electric leakage when the electric leakage occurs in the first battery 77. The control device 100 performs the measures process under the situation where the elevator mechanism 30 is in the lowered state, and the electrical connection achieved by the positive electrode relay 83 and the negative electrode relay 84 is turned on. Note that the situation where the control device 100 performs the measures process is mainly a situation where the rotating body 21 of the work machine 20 is operating, that is, a situation where the work machine 20 is cultivating a farm field.

As part of the measures process, the control device 100 performs a signal reception process, a state change process, an estimation process, a determination process, an evacuation notification process, a shutdown process, and a restriction process. In the signal reception process, the control device 100 receives the electric-leakage detection signal E from the electric leakage detection circuit 90. When the control device 100 receives the electric-leakage detection signal E, that is, when electric leakage occurs in the first battery 77 and its peripheral circuit, the control device 100 performs the state change process, the estimation process, the determination process, the evacuation notification process, the shutdown process, and the restriction process.

In the state change process, the control device 100 changes the state of the elevator mechanism 30. At the time of the start of the measures process, the elevator mechanism 30 is in the lowered state. The control device 100 changes the lowered state of the elevator mechanism 30 to the raised state.

In the estimation process, the control device 100 estimates a water content (hereinafter referred to as an electric-leakage-time water content) K in the ground 200 at the time when the electric leakage detection circuit 90 detects the electric leakage in the first battery 77. A value obtained by subtracting the second rotation speed Smg2 from the target rotation speed for the second electric motor 42 is referred to as a differential value. In the estimation process, the control device 100 calculates the electric-leakage-time water content K based on a differential value (hereinafter referred to as an electric-leakage-time differential value) ΔSmg2 at the time when the electric leakage detection circuit 90 detects the electric leakage in the first battery 77. Note that the water content in the ground 200 is a percentage [%] of water contained in the ground 200.

Now assumed is a case where the elevator mechanism 30 is in the lowered state, and the rotating body 21 is rotating. At this time, when the water content in the ground 200 is large, the rotating body 21 receives resistance by just that much, so that it is difficult for the rotating body 21 to rotate. Then, the second rotation speed Smg2 is distanced from the target rotation speed. That is, the second rotation speed Smg2 becomes slower than the target rotation speed. By using such a causal relationship, it is possible to calculate the water content in the ground 200 in association with the differential value.

In the control device 100, a water content map is stored in advance as information based on which the electric-leakage-time water content K is calculated. In the water content map, correspondence between the differential value and the water content in the ground 200 is defined. The water content map is created based on experiment, for example. Roughly speaking, in the water content map, the water content in the ground 200 increases as the differential value is larger. The control device 100 estimates the electric-leakage-time water content K based on the water content map.

In the determination process, the control device 100 determines whether or not the electric-leakage-time water content K calculated in the estimation process is less than a specified water content KZ. In the control device 100, the specified water content KZ is stored in advance. The specified water content KZ is determined by experiment, for example, as a water content that secures safety for the occupant to get off the tractor 10, in consideration of electric resistance corresponding to the water content in the ground 200. Note that, in the water content map, the water content in the ground 200 at the time when the differential value is zero is smaller than the specified water content KZ.

In the evacuation notification process, in a case where the control device 100 determines that the electric-leakage-time water content K is less than the specified water content KZ in the determination process, the control device 100 causes the display 15 to display information indicating that the occupant is allowed to get off the tractor 10. In the meantime, in the evacuation notification process, in a case where the control device 100 determines that the electric-leakage-time water content K is equal to or more than the specified water content KZ in the determination process, the control device 100 causes the display 15 to display information indicating that the occupant is not allowed to get off the tractor 10.

In the shutdown process, in a case where the control device 100 determines that the electric-leakage-time water content K is less than the specified water content KZ in the determination process, the control device 100 turns off the electrical connection achieved by the positive electrode relay 83 and the negative electrode relay 84.

In the restriction process, the control device 100 restricts output from the first battery 77. That is, in the control process, as for an electric power amount [Wh] as the product of electric power and time, the control device 100 sets an output upper limit Wout as an upper limit of the total amount of the electric power amount to be consumed by the first battery 77 per unit time. The control device 100 controls the first electric motor 41, the second electric motor 42, and the third electric motor 43 within a range where the electric power amount to be consumed by the first battery 77 does not exceed the output upper limit Wout. In the control device 100, the output upper limit Wout is stored in advance. The output upper limit Wout is determined by experiment, for example, as a value that satisfies the following three conditions.

(A) Even when the energized state of the first battery 77 is kept in a state where electric leakage occurs in the first battery 77, no trouble occurs in each part of the tractor 10.

(B) Even when the energized state of the first battery 77 is kept in a state where electric leakage occurs in the first battery 77, a discharging amount to the ground 200 via the wheels 12, for example, can be ignored.

(C) The tractor 10 can finish climbing a slope through which the tractor 10 can go in and out of the farm field.

Note that, in terms of (C), the inclination angle of the slope varies depending on the farm field. The maximum value of the inclination angle that the slope of the farm field can take is referred to as a maximum inclination angle. The maximum inclination angle is expected as the inclination angle of the slope in (C).

Specific Process Content of Measures Process

When an execution condition for the measures process is established, the control device 100 starts the measures process. In the control device 100, the execution condition is stored in advance. The execution condition is that all the following three items are satisfied.

(i) The tractor 10 is placed inside the farm field.

(ii) The elevator mechanism 30 is in the lowered state.

(iii) The electrical connection achieved by the positive electrode relay 83 and the negative electrode relay 84 is turned on.

The control device 100 determines whether the execution condition is established or not, based on a signal P from the operating portion 50 and a present control state on the targets to be controlled. More specifically, when the control device 100 has received, from the first switch 51, a signal P indicative of an ON state, the control device 100 determines that the item (i) is satisfied. Further, when the control device 100 has received, from the second switch 52, a signal P indicating that the elevator mechanism 30 is brought into the lowered state, the control device 100 determines that the item (ii) is satisfied. Further, when the control device 100 has received, from the ignition switch 55, a signal P indicative of an ON state, the control device 100 determines that the item (iii) is satisfied.

Figure 3:
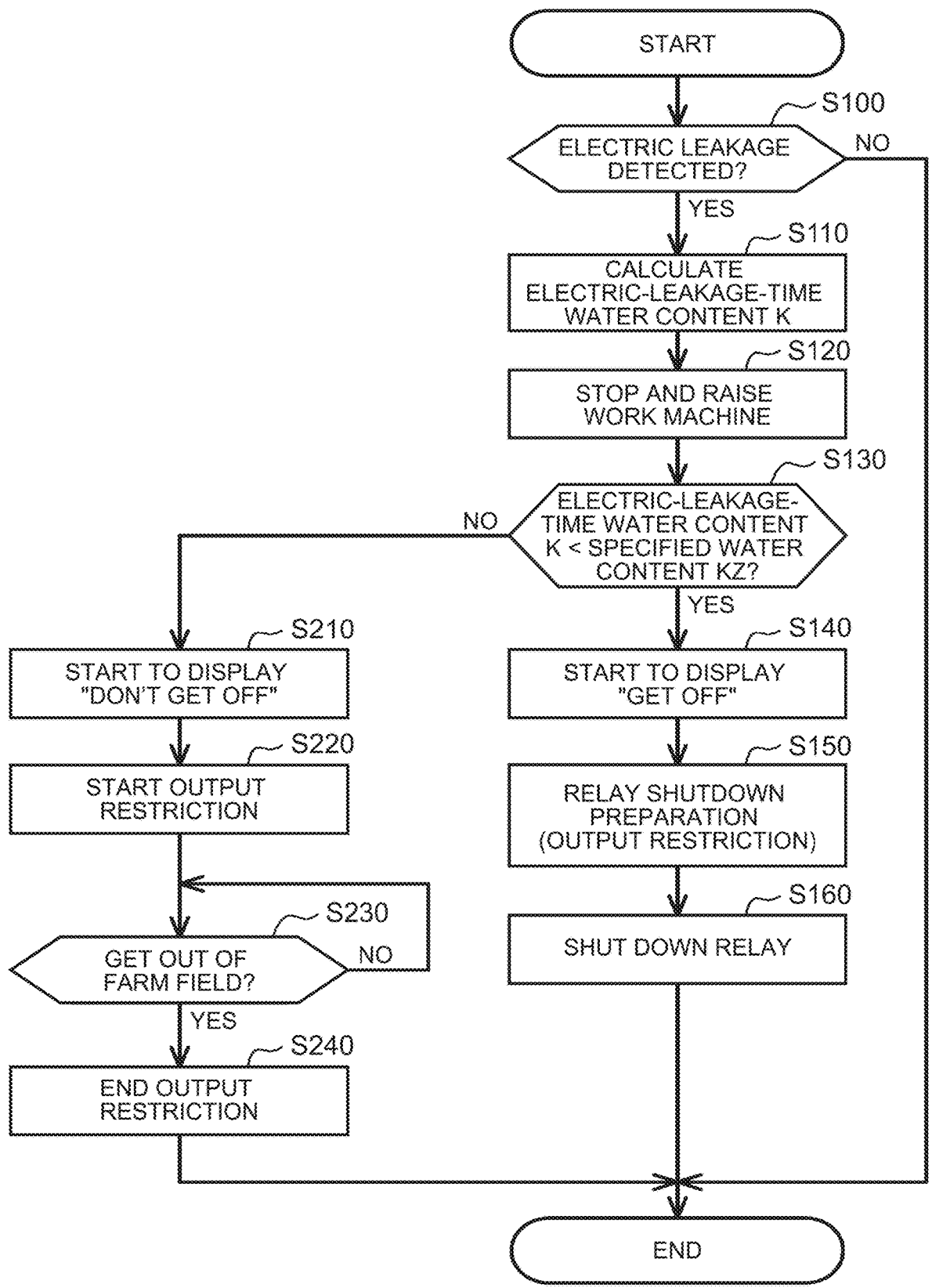
FIG. 3 is a flowchart illustrating the procedure of a measures process.

When the control device 100 starts the measures process in response to the establishment of the execution condition, the control device 100 performs the process of step S100. As illustrated in FIG. 3, in step S100, the control device 100 determines whether or not the electric leakage detection circuit 90 detects electric leakage in the first battery 77. More specifically, the control device 100 receives the electric-leakage detection signal E from the electric leakage detection circuit 90. When the control device 100 cannot receive the electric-leakage detection signal E, the control device 100 determines that no electric leakage is detected (step S100: NO). In this case, the control device 100 ends the series of processes as the measures process. After that, when the execution condition is established, the control device 100 performs the process of step S100 again.

In the meantime, when the control device 100 receives the electric-leakage detection signal E in step S100, the control device 100 determines that electric leakage is detected (step S100: YES). In this case, the control device 100 advances the process to step S110. Note that the process of step S100 is the signal reception process described above.

In step S110, the control device 100 calculates the electric-leakage-time water content K. In order to calculate the electric-leakage-time water content K, the control device 100 first refers to a latest target rotation speed and a latest second rotation speed Smg2. Then, the control device 100 calculates a value obtained by subtracting the latest second rotation speed Smg2 from the latest target rotation speed, as the electric-leakage-time differential value ΔSmg2. As described above, the electric-leakage-time differential value ΔSmg2 is a differential value at the time when the electric leakage detection circuit 90 detects electric leakage in the first battery 77. After that, the control device 100 refers to the water content map. Then, the control device 100 calculates a water content corresponding to the electric-leakage-time differential value ΔSmg2 in the water content map, as the electric-leakage-time water content K. After that, the control device 100 advances the process to step S120. Note that the process of step S110 is the estimation process described above.

In step S120, the control device 100 controls the second electric motor 42 and stops the rotating body 21 of the work machine 20. That is, the control device 100 stops the second electric motor 42. Note that, at the point when the process of step S120 is performed, the rotation of the rotating body 21 may stop. In this case, the control device 100 just maintains the state where the rotating body 21 stops. Further, in step S120, the control device 100 controls the third electric motor 43, the hydraulic circuit 36, and so on such that the elevator mechanism 30 is brought into the raised state. When the stop of the rotation of the rotating body 21 and the change in the state of the elevator mechanism 30 are completed, the control device 100 advances the process to step S130. Note that the control device 100 can grasp the stop of the rotation of the rotating body 21 when the second rotation speed Smg2 reaches zero. Further, the control device 100 can grasp the completion of the change in the state of the elevator mechanism 30 when a given period of time has passed from output of signals to the third electric motor 43, the control valve of the hydraulic circuit 36, and so on. Note that the process of step S120 is the state change process described above.

In step S130, the control device 100 determines whether or not the electric-leakage-time water content K is less than the specified water content KZ. More specifically, the control device 100 compares the magnitude of the electric-leakage-time water content K calculated in step S110 with the magnitude of the specified water content KZ. Then, the control device 100 determines whether or not the electric-leakage-time water content K is less than the specified water content KZ. In a case where the electric-leakage-time water content K is equal to or more than the specified water content KZ (step S130: NO), the control device 100 advances the process to step S210. Note that the process of step S130 is the determination process described above.

In step S210, the control device 100 starts to display a message on the display 15. The content of the message includes information indicating that electric leakage occurs, information indicating that the occupant is not allowed to get off the tractor 10, and information indicating that it is necessary to go out of the farm field by moving the tractor 10. That is, the control device 100 starts to output a display signal J for the content. When the display 15 receives the display signal J, the display 15 starts to display the content. After the control device 100 executes the process of step S210, the control device 100 advances the process to step S220.

In step S220, the control device 100 starts output restriction on the first battery 77. That is, the control device 100 sets the output upper limit Wout as the upper limit of the electric power amount to be consumable by the first battery 77. Note that, since the second electric motor 42 is stopped in the process of step S120, the second electric motor 42 stops at the point when the process of step S220 is performed. Further, after the elevator mechanism 30 is brought into the raised state by the process of step S120, the elevator mechanism 30 is not operated. That is, the third electric motor 43 is also stopped at the point when the process of step S220 is performed. Accordingly, the control device 100 substantially performs the output restriction on power supply to the first electric motor 41. After the control device 100 executes the process of step S220, the control device 100 advances the process to step S230.

In step S230, the control device 100 determines whether or not the tractor 10 goes out of the farm field. The process of step S230 is a process of grasping whether the occupant moves the tractor 10 out of the farm field upon receipt of the display on the display 15 along with the process of step S210. The control device 100 determines whether the determination content in step S230 is affirmative or not, based on the operation state of the first switch 51. In a case where the control device 100 has received the signal P indicative of the ON state from the first switch 51, that is, in a case where the tractor 10 is placed inside the farm field (step S230: NO), the control device 100 performs the process of step S230 again.

The control device 100 repeats the process of step S230 until the control device 100 receives a signal P indicative of an OFF state from the first switch 51, that is, until the tractor 10 is placed outside the farm field. When the control device 100 receives the signal P indicative of the OFF state from the first switch 51 (step S230: YES), the control device 100 advances the process to step S240.

In step S240, the control device 100 ends the output restriction on the first battery 77. The control device 100 then ends the series of processes as the measures process. Note that the process of restricting the output from the first battery 77 during the processes from step S220 to step S240 is the restriction process described above.

Note that the display on the display 15 that is started in response to the process of step S210 continues until the occupant operates the third switch 56 for reset. When the occupant operates the third switch 56 for reset, the control device 100 ends the output of the display signal J to the display 15. Along with this, the display 15 ends the display of the message. A timing when the occupant operates the third switch 56 can be set variously, e.g., a timing after the tractor 10 is moved out of the farm field, or a timing when the tractor 10 is brought into a maintenance shop. The process from the start of the output of the display signal J to the display 15 in step S210 to the end of the output of the display signal J is the evacuation notification process described above.

Now, in a case where the electric-leakage-time water content K is less than the specified water content KZ in step S130 (step S130: YES), the control device 100 advances the process to step S140.

In step S140, the control device 100 causes the display 15 to start to display a message. The content of the message includes information indicating that electric leakage occurs, information indicating that the occupant is allowed to get off the tractor 10, and information indicating that it is necessary to get off the tractor 10 and go out of the farm field. That is, the control device 100 starts to output a display signal J indicative of the content. When the display 15 receives the display signal J, the display 15 starts to display the content. After the control device 100 executes the process of step S140, the control device 100 advances the process to step S150.

In step S150, the control device 100 performs a preparation process to turn off the electrical connection achieved by the positive electrode relay 83 and the negative electrode relay 84. Here, at the stage where the process of step S150 is performed, the electrical connection achieved by the positive electrode relay 83 and the negative electrode relay 84 is turned on. Under the situation where the electrical connection achieved by the positive electrode relay 83 and the negative electrode relay 84 is turned on, the control device 100 executes a plurality of processes for various devices to which a current from the first battery 77 is applied. One example of the processes is a process to cause the first converter 85 to increase the voltage. In order to turn off the electrical connection achieved by the positive electrode relay 83 and the negative electrode relay 84, it is necessary to end those processes in advance so as to stop respective operations of the devices in advance. Hereby, when the electrical connection achieved by the positive electrode relay 83 and the negative electrode relay 84 is turned off, no burden is put on the devices. In view of this, in the process of step S150, the control device 100 ends various processes necessary to be ended in advance in consideration of turning off the electrical connection achieved by the positive electrode relay 83 and the negative electrode relay 84. In the meantime, the control device 100 performs output restriction on the first battery 77. The content of the output restriction is the same as the output restriction performed in the processes from step S220 to step S240. That is, the control device 100 also performs the restriction process in step S150. After the control device 100 executes the process of step S150, the control device 100 advances the process to step S160.

In step S160, the control device 100 turns off the electrical connection achieved by the positive electrode relay 83 and the negative electrode relay 84. After this, the control device 100 ends the series of processes as the measures process. Note that the display on the display 15 that is started in response to the process of step S140 is ended when the occupant operates the third switch 56 for reset, similarly to the above. This is the same as the description made in terms of the process of step S210. The process from the start of the output of the display signal J to the display 15 in step S140 to the end of the output of the display signal J is the evacuation notification process described above.

Operations of Embodiment

Now assume a case where the tractor 10 is cultivating the farm field. That is, the elevator mechanism 30 is in the lowered state, and the rotating body 21 of the work machine 20 is rotating. While the farm field is being cultivated, the control device 100 performs the measures process. When the electric leakage detection circuit 90 detects electric leakage in the first battery 77 (step S100: YES), the control device 100 stops the rotation of the rotating body 21 and brings the elevator mechanism 30 into the raised state (step S120). Hereby, the rotating body 21 is raised to a position distanced from the ground 200. After that, when the water content of the ground 200 is large (step S130: NO), the control device 100 causes the display 15 to display information indicating that the occupant is not allowed to get off the tractor 10 (step S210). In response to this display, the occupant moves the tractor 10 out of the farm field. During this period, the control device 100 restricts the output from the first battery 77 (step S220, step S240). In the meantime, when the water content of the ground 200 is small (step S130: YES), the control device 100 causes the display 15 to display information indicating that the occupant is allowed to get off the tractor 10 (step S140). Then, the control device 100 turns off the electrical connection achieved by the positive electrode relay 83 and the negative electrode relay 84 (step S150). In this case, the occupant gets off the tractor 10, leaves the tractor 10, and further evacuates outside the farm field.

Note that, as described above, at the point when the process of step S120 is performed, the rotation of the rotating body 21 may stop. In this case, the control device 100 performs a process to be executed when the water content in the ground 200 is small (step S130: YES). That is, in a case where the rotation of the rotating body 21 stops at the point when the process of step S120 is performed, the electric-leakage-time differential value $\Delta Smg2$ to be calculated in step S110 is zero. In connection with the content of the water content map that has been already described, when the electric-leakage-time differential value $\Delta Smg2$ is zero, the determination in step S130 is YES. Then, the control device 100 causes the display 15 to display information indicating that the occupant is allowed to get off the tractor 10 in step S140, and the control device 100 turns off the electrical connection achieved by the positive electrode relay 83 and the negative electrode relay 84 (step S160). Here, the situation where the rotation of the rotating body 21 stops at the point when the process of step S120 is performed is a situation where the elevator mechanism 30 is in the lowered state, and the rotation of the rotating body 21 stops. In this situation, the tractor 10 usually stops without traveling. In this case, each of the electric motors stops, so that the output from the first battery 77 is extremely small. Even in a case where electric leakage occurs in the first battery 77 in such a situation, the safety around the tractor 10 is not impaired. Accordingly, in response to the display indicating that the occupant is allowed to get off the tractor 10, the occupant gets off the tractor 10 and evacuates.

Effects of Embodiment (1) The ground 200 of the farm field may be wet and easily electrically conductive in some cases. While the farm field is being cultivated, the work machine 20 is brought into contact with the ground 200 in such a state. Accordingly, when electric leakage occurs in the first battery 77 and its peripheral circuit during the cultivation of the farm field, electricity may flow through the work machine 20 from the first battery 77. Besides, the first battery 77 is a high-voltage battery. Accordingly, in a case where electric leakage occurs in the first battery 77, the electric leakage amount from the first battery 77 is large. On this account, when electricity flows toward the work machine 20 along with electric leakage in the first battery 77, various parts of the tractor 10, including a device placed on a path of the electricity, may have troubles.

In the present embodiment, in a case where the electric leakage detection circuit 90 detects electric leakage in the first battery 77 (step S100: YES), the elevator mechanism 30 is brought into the raised state (step S120). Hereby, the work machine 20 is distanced from the ground 200. Accordingly, even in a case where the farm field is in a state where electricity easily flows therethrough, it is possible to prevent leaked electricity from flowing into the farm field through the work machine 20. Accordingly, even when electric leakage occurs in the first battery 77 and its peripheral circuit, it is possible to prevent electricity from flowing through the work machine 20 or the like.

(2) In a case where the electric-leakage-time water content K is small, it is difficult for electricity to flow through the ground 200 in balance with electric resistance of the ground 200. Under such a situation, the occupant can get off the tractor 10. When the occupant gets off the tractor 10, the occupant can be distanced from the tractor 10. Accordingly, the safety for the occupant can be secured more surely. In the meantime, in a case where the electric-leakage-time water content K is large, electricity easily flows through the ground 200.

In view of this, in the present embodiment, in a case where the electric-leakage-time water content K is less than the specified water content KZ (step S130: YES), the display 15 is caused to display information indicating that the occupant should get off the tractor 10 and evacuate (step S140). In the meantime, in a case where the electric-leakage-time water content K is equal to or more than the specified water content KZ (step S130: NO), the display 15 is caused to display information indicating that the occupant should move the tractor 10 so as to evacuate (step S210). By displaying such information, it is possible to present a safer evacuation way to the occupant.

(3) As described above, in the present embodiment, in a case where the electric-leakage-time water content K is less than the specified water content KZ (step S130: YES), the display 15 is caused to display information indicating that the occupant should get off the tractor 10 and evacuate (step S140). In response to this display, the occupant gets off the tractor 10. In this case, the tractor 10 is not operated afterward, so that it is not necessary to keep the first battery 77 in the energized state.

In view of this, in the present embodiment, after the display 15 is caused to display the information indicating that the occupant should get off the tractor 10 and evacuate, the electrical connection achieved by the positive electrode relay 83 and the negative electrode relay 84 is turned off immediately (step S160). Accordingly, the first battery 77 is brought into the non-energized state afterward. As a result, no electric leakage occurs in the first battery 77 and its peripheral circuit. Accordingly, it is possible to restrain electric leakage in the first battery 77 and its peripheral circuit to a minimum.

(4) In the present embodiment, after the elevator mechanism 30 is brought into the raised state, the output restriction is performed on the first battery 77. More specifically, in a case where the electric-leakage-time water content K is less than the specified water content KZ (step S130: YES), the output restriction is performed on the first battery 77 during the preparation process to turn off the electrical connection achieved by the positive electrode relay 83 and the negative electrode relay 84 (step S150). Further, in a case where the electric-leakage-time water content K is equal to or more than the specified water content KZ (step S130: NO), the output restriction is performed on the first battery 77 while the occupant moves the tractor 10 out of the farm field (step S220, step S240). By restraining the output from the first battery 77 as such, it is possible to restrain an electric leakage amount from the first battery 77 and its peripheral circuit.

(5) In the present embodiment, the second rotation speed Smg2 is used to calculate the electric-leakage-time water content K. The second rotation speed Smg2 is calculated based on the detection signal A2 detected by the second rotation sensor 62. The second rotation sensor 62 is a sensor that generally should be provided in the tractor 10 in balance with the control on the second electric motor 42. Stated differently, the second rotation sensor 62 is an existing sensor to be provided in the tractor 10 even in a case where the electric-leakage-time water content K is not calculated. With the use of the existing sensor like the present embodiment, it is possible to avoid an increase in the number of parts and an increase in cost in order to estimate the electric-leakage-time water content K.

Modifications

The present embodiment can also be carried out by adding changes as stated below. The present embodiment and the following modifications can be carried out in combination as long as they do not cause any technical inconsistencies.

The process content of the measures process is not limited to the example in the above embodiment. In the measures process, when the electric leakage detection circuit 90 detects electric leakage in the first battery 77, the elevator mechanism 30 should be brought into the raised state. For example, in terms of the process of step S120, the rotation of the rotating body 21 may not be stopped. Even in a case where the rotation of the rotating body 21 is continued, when the elevator mechanism 30 is brought into the raised state, the work machine 20 is distanced from the ground 200, so that it is possible to prevent electricity from flowing through the work machine 20.

In terms of the process of step S110, the calculation method of the electric-leakage-time water content K is not limited to the example in the above embodiment. For example, a moisture sensor configured to detect the water content in the ground 200 may be provided in the tractor 10 so that the electric-leakage-time water content K is calculated based on a detection value from such a sensor.

The notification method in the processes of step S140 and step S210 is not limited to the example in the above embodiment. For example, instead of or in addition to displaying a message on the display 15, voice guidance for the content of the message displayed on the display 15 may be performed. In this case, a speaker as a notification device configured to perform notification by sound should be provided in the tractor 10. Then, the speaker should be assumed as a target to be controlled by the control device 100.

In terms of the processes of step S140 and step S210, the notification may be performed by an alarm lamp, for example. In this case, as a notification device configured to perform notification by light, an alarm lamp for notification of electric leakage in the first battery 77 should be provided. The alarm lamp should be a target to be controlled by the control device 100. For example, when the color of the alarm lamp to be turned on in step S140 and the color of the alarm lamp to be turned on in step S210 are different from each other, the occupant can grasp a difference in a situation depending on the amount of the electric-leakage-time water content K. The notification performed by the alarm lamp may be performed together with at least either one of the display of a message and the voice guidance, or only the notification using the alarm lamp may be performed.

In terms of the processes of step S140 and step S210, the notification may be performed by a buzzer, for example. In this case, similarly to the modification of the voice guidance, a speaker as a notification device should be provided in the tractor 10. Further, similarly to the modification of the alarm lamp, when different sounds are employed for step S140 and for step S210, the occupant can grasp a difference in a situation depending on the amount of the electric-leakage-time water content K. The notification by the buzzer may be performed together with at least any one of the display of a message, the voice guidance, and the alarm lamp, or only the notification using the buzzer may be performed.

Different configurations may be employed in step S140 and step S210 as the notification method.

The notification processes of step S140 and step S210 may be omitted. Even in this case, when the elevator mechanism 30 is brought into the raised state in the process of step S120, no electricity flows through the work machine 20.

How to determine the output upper limit Wout at the time when the output restriction is performed on the first battery 77 is not limited to the example of the above embodiment. For example, the output upper limit Wout may be determined only in consideration of the condition (C) without considering the conditions (A), (B). Further, it is not necessary to set a general-purpose output upper limit Wout that is applicable to various farm fields. That is, in a case where the farm field to be cultivated by the tractor 10 is limited only to a particular farm field, an output upper limit Wout suitable for the farm field should be set. For example, the condition (C) may be set to an electric power amount that allows the tractor 10 to finish climbing a slope of the particular farm field. The electric power amount that allows the tractor 10 to finish climbing the slope of the particular farm field can be grasped from the electric power amount required at the time when the tractor 10 climbs the slope previously.

As described in the modification, how to determine the output upper limit Wout is modifiable appropriately. Only if the output restriction is performed regardless of the size of the output upper limit Wout, it is possible to restrain an electric leakage amount from the first battery 77 and its peripheral circuit to some extent.

Step S150 and step S220 may use different values as the output upper limit Wout.

The output upper limit Wout may be changed in the middle of the output restriction on the first battery 77.

The output restriction on the first battery 77 may be omitted. As described above, even in this case, the elevator mechanism 30 should be brought into the raised state.

In terms of the process of step S160, instead of turning off the electrical connection achieved by the positive electrode relay 83 and the negative electrode relay 84, the control device 100 may notify that it is necessary to turn off the ignition switch 55. In this case, a notification device configured to notify that it is necessary to turn off the ignition switch 55 should be provided in the tractor 10. As the notification device, the display 15 of the above embodiment may be used, or a speaker or an alarm lamp may be provided in the tractor 10 like the above modifications, for example. Similarly to the processes of step S140 and step S210, the notification should be performed by a method of displaying a message, performing voice guidance, turning on an alarm lamp, or ringing a buzzer, for example. That is, any method can be employed, provided that it is possible to notify that it is necessary to turn off the ignition switch 55 by at least either one of light and sound.

In terms of the process of step S160, the configurations of the above modifications and the configuration of the above embodiment may be combined with each other. That is, in a case where the occupant does not operate the ignition switch 55 even when a predetermined period of time elapses after the occupant is notified that it is necessary to turn off the ignition switch 55, the control device 100 may turn off the electrical connection achieved by the positive electrode relay 83 and the negative electrode relay 84.

The process of step S160 itself may be omitted. That is, the configuration related to turning off the electrical connection achieved by the positive electrode relay 83 and the negative electrode relay 84 may be omitted. As described above, even in this case, the elevator mechanism 30 should be brought into the raised state.

In terms of the process of step S120, instead of bringing the elevator mechanism 30 into the raised state, the control device 100 may perform a change notification process of notifying that it is necessary to change the elevator mechanism 30 to the raised state. In this case, a notification device configured to notify that it is necessary to change the elevator mechanism 30 to the raised state should be provided in the tractor 10. As the notification device, the display 15 in the above embodiment may be used, or a speaker or an alarm lamp may be provided in the tractor 10 like the above modifications, for example. Then, similarly to the processes of step S140 and step S210, the notification should be performed by a method of displaying a message, performing voice guidance, turning on an alarm lamp, or ringing a buzzer, for example. That is, any method can be employed, provided that it is possible to notify that it is necessary to change the elevator mechanism 30 to the raised state by at least either one of light and sound. That is, when the occupant is notified that it is necessary to change the elevator mechanism 30 to the raised state, the occupant brings the elevator mechanism 30 into the raised state in response to the notification. Hereby, the work machine 20 is distanced from the ground 200. Accordingly, even in a case where the farm field is wet and electricity easily flows therethrough, it is possible to prevent leaked electricity from flowing into the farm field through the work machine 20. Accordingly, even when electric leakage occurs in the first battery 77 and its peripheral circuit, it is possible to prevent electricity from flowing through the work machine 20 or the like.

In a case where the state change of the elevator mechanism 30 is notified like the above modification, it is possible to employ, in step S160, a process of turning off the electrical connection achieved by the positive electrode relay 83 and the negative electrode relay 84. In this case, the execution of the process of step S160 should be prohibited until the elevator mechanism 30 is brought into the raised state. That is, even though the occupant is notified of the state change of the elevator mechanism 30, the occupant may not operate the second switch 52. When the electrical connection achieved by the positive electrode relay 83 and the negative electrode relay 84 is turned off in such a state, the work machine 20 cannot be changed to the raised state. In order to prevent such a situation, the electrical connection achieved by the positive electrode relay 83 and the negative electrode relay 84 should be turned off on the condition that the elevator mechanism 30 is in the raised state. The same can apply to the output restriction on the first battery 77. That is, in a case where the state change of the elevator mechanism 30 is to be notified and the output restriction on the first battery 77 is employed, the output restriction should be performed on the condition that the elevator mechanism 30 is in the raised state.

In terms of the process of step S120, the configuration to notify the state change of the elevator mechanism 30 and the configuration of the above embodiment may be combined with each other. That is, in a case where the occupant does not operate the second switch 52 even when a predetermined period of time elapses after the occupant is notified that it is necessary to change the elevator mechanism 30 to the raised state, the control device 100 may bring the elevator mechanism 30 into the raised state.

The method of grasping whether the tractor 10 is placed in the farm field or not is not limited to the method using the first switch 51. For example, position information from a GPS and map information may be used. In this case, a GPS receiver should be provided in the tractor 10, and the map information should be stored in the control device 100.

The configuration of the electric leakage detection circuit 90 is not limited to the example in the above embodiment. Any configuration can be employed, provided that the electric leakage detection circuit 90 can detect electric leakage in the first battery 77 and its peripheral circuit.

The electric leakage detection circuit 90 may be incorporated in part of the control device 100.

The overall configuration of the tractor 10 is not limited to the example in the above embodiment. For example, the elevator cylinder 37 may be configured to be mechanically driven by the third electric motor 43, instead of being driven hydraulically. In this case, a mechanism configured to convert a rotational motion of the third electric motor 43 into a linear motion should be provided between the third electric motor 43 and the elevator cylinder 37.

In terms of the operating portion 50, a portion configured as a switch may be changed to a lever, or a portion configured as a lever may be changed to a switch. Any configuration can be employed, provided that instructions from the occupant to operate various portions of the tractor 10 can be input into the control device 100 via the operating portion 50.

The configuration of the work machine 20 may be changed. The work machine 20 can be any machine, provided that the work machine 20 operates by a torque from the PTO 25.

The tractor 10 may be configured as a hybrid electric vehicle using an electric motor and an engine as drive sources.

A place where the tractor 10 is used, that is, a place where an operation suitable for the purpose of the work machine 20 is performed is not limited to the farm field. Regardless of the place where the tractor 10 is used, when the elevator mechanism 30 is brought into the raised state at the time when electric leakage occurs in the first battery 77 and its peripheral circuit under the situation where the elevator mechanism 30 is in the lowered state, it is possible to prevent electricity from flowing through the work machine 20.

What is claimed is:

1. A tractor comprising:
a vehicle body;
a work machine connected to the vehicle body;
an elevator mechanism configured to move the work machine up and down;
an electric motor serving as a drive source for the work machine;
a battery configured to supply electric power to the electric motor;
an electric leakage detection circuit configured to detect electric leakage in the battery; and
a control device configured to control the elevator mechanism as a target to be controlled, wherein:
the control device controls the elevator mechanism either in a lowered state or in a raised state, the lowered state being a state where the work machine is placed at a position making contact with a ground, the raised state being a state where the work machine is placed at a position distanced from the ground; and
in a case where the electric leakage detection circuit detects electric leakage in the battery when the elevator mechanism is in the lowered state, the control device performs a state change process of bringing the elevator mechanism into the raised state.

2. The tractor according to claim 1 further comprising a notification device configured to perform notification by at least either one of light and sound, wherein, in a case where the electric leakage detection circuit detects electric leakage in the battery when the elevator mechanism is in the lowered state, the control device performs the following processes:

an estimation process of estimating a water content in the ground at a time when the electric leakage detection circuit detects the electric leakage;

a determination process of determining whether or not the water content is less than a specified water content determined in advance; and an evacuation notification process of, in a case where the control device determines that the water content is less than the specified water content in the determination process, causing the notification device to notify that an occupant is allowed to get off the tractor, and in a case where the control device determines that the water content is equal to or more than the specified water content in the determination process, causing the notification device to notify that the occupant is not allowed to get off the tractor.

3. The tractor according to claim 2 further comprising a relay configured to turn on and off electrical connection between the battery and the electric motor, wherein, in a case where the control device determines that the water content is less than the specified water content in the determination process, the control device performs a shutdown process of turning off the electrical connection achieved by the relay, on condition that the elevator mechanism is in the raised state.

4. The tractor according to claim 1, wherein, in a case where the electric leakage detection circuit detects electric leakage in the battery when the elevator mechanism is in the lowered state, the control device performs a restriction process of restricting output from the battery, on condition that the elevator mechanism is in the raised state.

\* \* \* \* \*